(12) United States Patent
Hepburn (10) Patent No.: US 7,954,194 B2
(45) Date of Patent: Jun. 7, 2011

(54) PIG EXTRACTING DEVICE

(75) Inventor: Timothy Hepburn, El Segundo, CA (US)

(73) Assignee: Southern California Gas Company, Los Angeles, CA (US)

( * ) Notice: Subject to any disclaimer, the term of this patent is extended or adjusted under 35 U.S.C. 154(b) by 789 days.

(21) Appl. No.: 12/002,022

(22) Filed: Dec. 14, 2007

(65) Prior Publication Data

US 2009/0152520 A1    Jun. 18, 2009

(51) Int. Cl.
*B08B 9/04* (2006.01)
(52) U.S. Cl. ............................. 15/104.062; 15/104.061
(58) Field of Classification Search ............. 15/104.062, 15/104.061, 104.001; 134/8, 22.1, 22.11, 134/22.12, 166 R, 166 C; 254/227
See application file for complete search history.

(56) References Cited

U.S. PATENT DOCUMENTS

| | | | | |
|---|---|---|---|---|
| 2,575,146 A * | 11/1951 | Thomas | ................... | 15/104.062 |
| 4,016,621 A * | 4/1977 | Slegers et al. | ............ | 15/104.062 |
| 5,769,955 A * | 6/1998 | Kozisek | ............................ | 134/8 |
| 6,925,671 B1 * | 8/2005 | Mouton | ................... | 15/104.062 |
| 7,536,742 B2 * | 5/2009 | Schlosser | ................. | 15/104.062 |

* cited by examiner

*Primary Examiner* — Dung Van Nguyen
(74) *Attorney, Agent, or Firm* — Klein, O'Neill & Singh, LLP (57) ABSTRACT

A portable device for extracting a pig from a pipeline which uses a lifting means to raise or lower the device and wheels or other suitable means to allow for the device to be easily and quickly moved into position with minimal man power improving the efficiency and safety of the pig extraction process.

20 Claims, 6 Drawing Sheets

PIG EXTRACTING DEVICE

BACKGROUND OF THE INVENTION

Modern pipelines are used to efficiently transport various solid, gas and liquid materials. Exemplary materials include crude oil, gasoline and natural gas. Regardless of the type of materials they transport, the ability to perform various operations on a pipeline with minimal disruption to the flow of product is essential in the pipeline industry.

A pipeline inspection gauge or "pig" is a tool inserted into the flow of material through a pipeline and propelled by the pressure of the material being transported in the pipeline. Uses for pigs include, but are not limited to: 1) physical separation between different materials being transported in the same pipeline; 2) cleaning of the internal surfaces of a pipeline; and 3) inline-inspection of the integrity of the pipeline.

It is generally believed that pigs where first used in the United States in the mid to late 1800's as the oil industry replaced horse drawn transportation with pipelines for the transportation of crude oil from well sites to refineries. The oil industry discovered that over time internal deposits in the pipelines restricted the flow of materials resulting in higher pumping pressures and decreased efficiency. To improve flow, the companies began bundling various materials together to insert into the pressurized stream of material. As these bundles of material passed through the pipeline they would dislodge deposits and provide immediate flow improvement. It is rumored that early pigs were made of bundles of leather or straw wrapped in wire. As these bundles traveled through the pipeline there were said to make a squealing noise sounding like a pig. The term "pipeline inspection gauge" is thought to have been created later as a backronym.

There are several different types of modem day pigs. There are "batching" or "swabbing" pigs that are designed to act as a simple barrier between dissimilar fluids or to provide a sweep of a pipeline. If more than a simple sweep is desired, more elaborate "cleaning" pigs can be used. Cleaning pigs can be mounted with all manner of brushes, scrapers, blades or aggressive high tensile strength steel protrusions for removing interior deposits or scales. Pigs specially designed for inline inspection rather than cleaning include "gauging" pigs which include a simple gauge plate made of soft material which deforms when it collides with a protrusion on the interior surface of the pipeline or "smart or intelligent" pigs which carry out complex tasks such as logging data for mapping, geometric measurement, crack detection, measurement of metal loss, and many other tasks as they travel through a pipeline.

As explained above, most pigs are propelled by the pressure of the material being transported in the pipeline. They accomplish this propulsion through the simple creation of a pressure differential between the rear and front sides of the pig. Most pigs achieve this differential pressure gradient though the use of one or more sealing elements which positively engages the interior surface of the pipeline thereby creating a frictional force working opposite to the desired direction of travel. The pressure applied to the rear side of the pig by the pressurized material increases to overcome the opposite frictional force created by the sealing element(s) thus creating the pressure differential between the rear and front side of the pig. Eventually, pressure on the high side exceeds the frictional force, and the pig moves in the direction of the low-pressure front side thereby propelling the pig in the direction that the material is flowing in the pipeline.

As also explained above, it is important to be able to perform the cleaning, batching and inspecting functions on pipelines for which pigs are designed, without shutting down or otherwise interrupting the flow of materials. To minimize any interruption as much as possible, pipelines are often equipped with secondary pipeline chambers from which pigs can be inserted or removed from the main pipeline. These chambers, referred to commonly as "pig launchers" and "pig catchers," are connected to the main pipeline via a series of valves. These valves allow for the opening and closing of the chamber to the main pipeline and for the routing of pressurized material from the main pipeline to the rear of the chamber to pressurize the chamber once the pig is loaded and ready to be injected into the main line.

The increased size of the pipelines, combined with increased pig complexity, has led to an increase in size and weight of modem pigs. As explained in U.S. Pat. No. 6,925,671, the industry has in the past relied upon man power, sometimes in combination with trucks or other non-specialized vehicles, to insert and extract pigs. Due to safety considerations, for example ignition of flammable materials being transported in the pipeline or crushing injuries caused by the loss of control of the pig, a need exists for a portable device which can be easily and quickly positioned in front of the pipeline and used to quickly extract a pig with a minimal use of man power and minimal reliance on other devices such as trucks, tractors, backhoes, etc.

DETAILED DESCRIPTION AND ILLUSTRATIVE EMBODIMENTS

The following descriptions and examples are included to illustrate preferred embodiments of the present invention. Those skilled in the art will appreciate that these descriptions and examples represent techniques discovered by the inventor to function well in the practice of the invention, and thus constitute a preferred mode for its practice. Nonetheless, those skilled in the art will also appreciate that, in light of the present disclosure, many changes can be made in these illustrative embodiments that will not result in a departure from the spirit and scope of the invention.

FIGS. 1 through 4 illustrate a preferred embodiment of the pig extraction device which is within the scope of the claimed invention. Unless otherwise specified the individual components of the pig extraction device are composed of steel. Nonetheless, any material capable of withstanding the forces imposed on the device by the weight of the pig being extracted and otherwise safe for the conditions under which the pig is being removed, may be used. For example, if the particular pig is being extracted from a pipeline carrying flammable material such as natural gas, certain plastic materials that could lead to the generation of static electricity as the pig is slides onto them, would be unsafe, even though they could withstand the weight of the pig.

Figure 1:
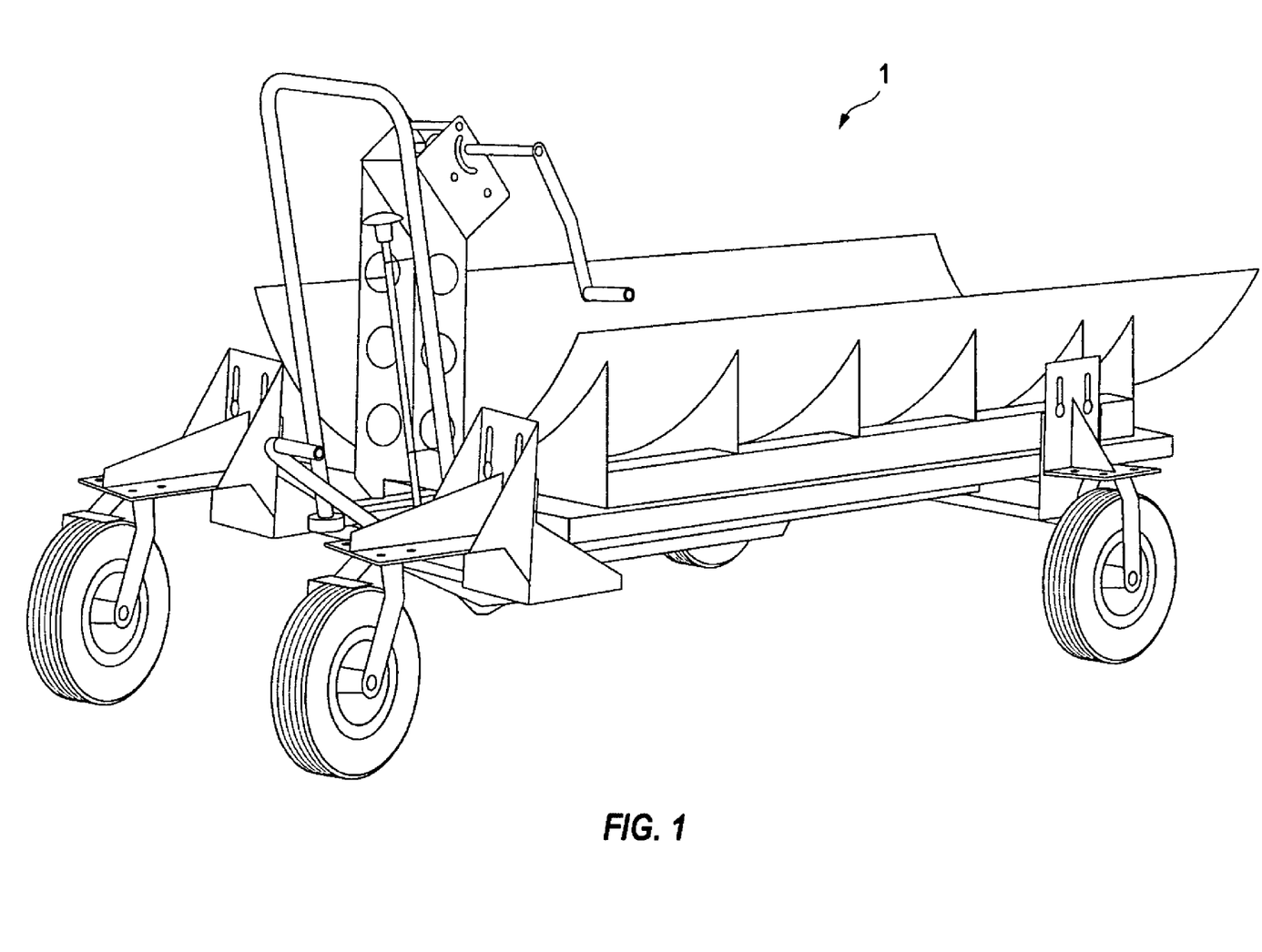
FIG. 1 depicts an illustrative embodiment of a pig extracting device wherein the lifting mechanism is completely retracted showing the device at its lowest height.
Figure 2:
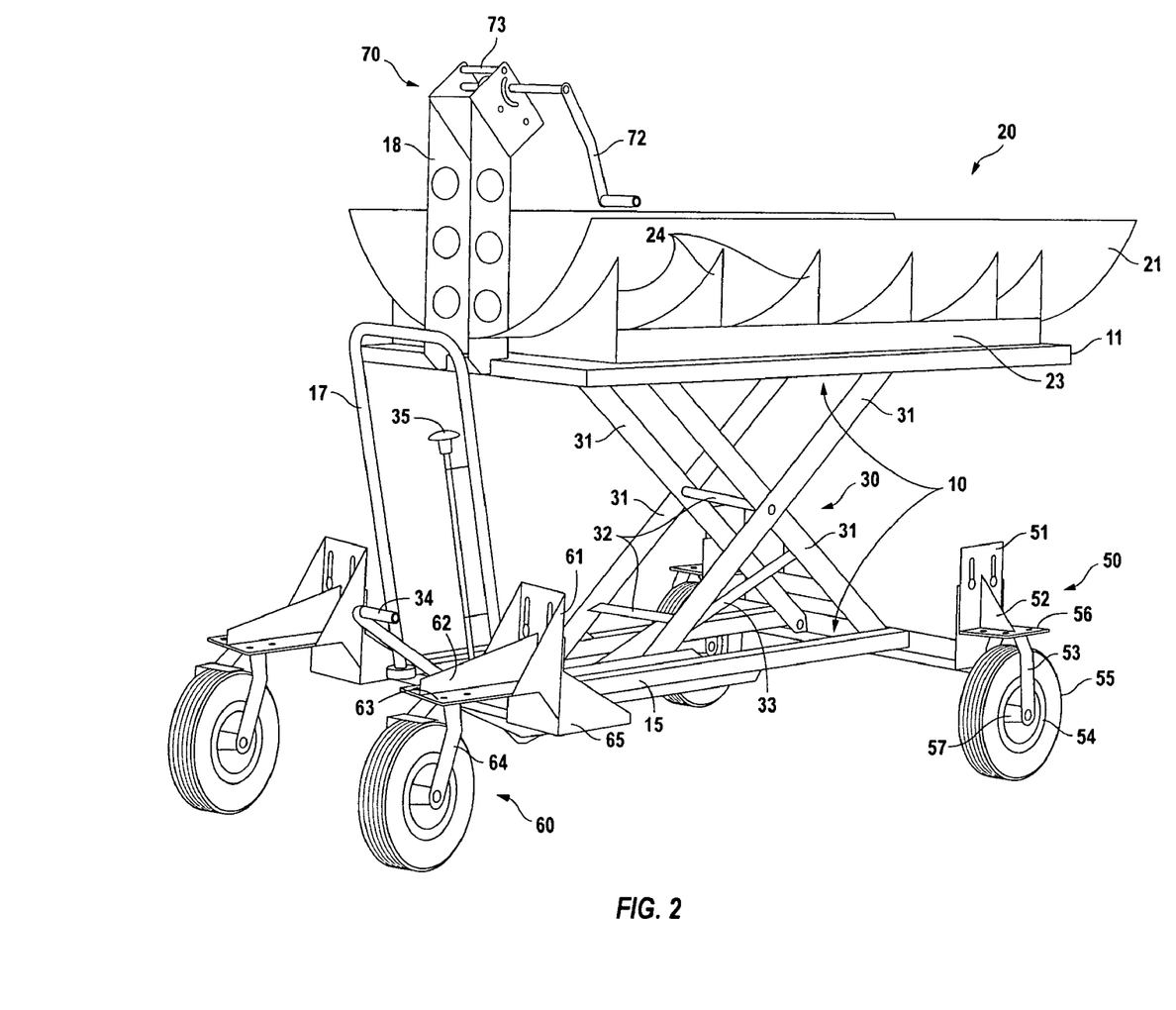
FIG. 2 depicts another view of this illustrative embodiment wherein the lifting mechanism has been raised.

FIGS. 1 and 2 depict a portable pig extraction device in two positions. In FIG. 1 the device is lowered as low as possible. In FIG. 2 the device has been raised as it might be to match the height of the pipeline from which a pig was being extracted or removed. The device generally comprises a frame assembly 10, a tray assembly 20, a lifting assembly 30, rear wheel assembly 50, front wheel assembly 60, and a winch assembly 70.

Referring to FIG. 2, it can be seen that frame assembly 10 is comprised of a top frame 11 and bottom frame 15. In this illustrative embodiment, the top and bottom frames are comprised of four outer sides composed of steel square tubing welded or otherwise attached to generally form a rectangle. Additional cross-supports may be added to the interior of these rectangles to add additional support to attach other components of the device. Of course materials other than square steel tubing may be used and the type of materials used is limited only to the weight and safety limitations briefly discussed above or otherwise known to those skilled in the art. The distance between these two frames can be increased or decreased through use of the lifting assembly to raise or lower the device as needed.

In the illustrative embodiment top frame 11 is attached on one side to tray assembly 20 using one or more bolts of sufficient grade and material. The top frame and tray assembly could likewise be attached by welding them together or using any other technique known to those skilled in the art. In the illustrative embodiment, top frame 11 is also attached to the lifting assembly 30. Additionally, winch assembly post 18 is also attached to top frame 11 and the handle 17, which is used for steering and otherwise moving the device and which is attached to bottom frame 15.

Tray assembly 20 is the component of the device upon which the pig will rest once it has been extracted from its pipeline. Tray assembly 20 comprises several parts including tray channel 21, one or more tray channel struts 23, and tray channel trusses 24. In the illustrative embodiment the components of the tray assembly 20 are all made out of aluminum, but can be made our of other materials such as stainless steel, plastic, composite materials or other materials known by those skilled in the art to be of sufficient strength and safe for the particular conditions under which the device will be operated may be used.

To prevent the generally round pig from accidentally rolling off the device, tray channel 21 is generally c-shaped or u-shaped and resembles a trough. Those skilled in the art appreciate that the tray channel is not limited to these specific shapes and any shape that helps stabilize the pig once it rests on the device may be used. Additionally, the size of the tray used will depend on the size of the pig being extracted. FIG. 2 shows that the tray channel trusses are triangular in shape, with the side of the triangle which attaches to the tray channel being generally concave such that it matches the shape of the tray channel. In the illustrative embodiment, the tray channel struts are composed of square steel tubing. Although the illustrative embodiment shows all three components are welded together to form the tray assembly, other suitable means of attaching these components together, depending on the type of materials from which they are composed, can also be used.

The lifting assembly 30 comprises several components including but not limited to a linear hydraulic motor 33 attached to folding cross supports 31. As is generally known to those skilled in the art, the linear hydraulic motor further comprises a hydraulic cylinder, hydraulic pump and a piston rod. These individual components of the linear hydraulic motor are generally known to those skilled in the art and not specifically shown in the drawings. In addition, the hydraulic cylinder used can contain either a single piston rod or multiple piston rods. When multiple piston rods are used the cylinder is often referred to as a "telescopic cylinder" because of the telescopic action of the multiple piston rods. Such telescopic cylinders are often used when the length of the hydraulic cylinder is a restriction because they allow for the same amount of total stroke with a much shorter length cylinder than a single piston rod cylinder.

In the embodiment shown in FIG. 2, there are four folding supports 31 which, in conjunction with the linear hydraulic motor, provide the lifting force for the device. Each end of each folding support is attached to either the top or bottom frame. Additionally, if one end is attached to the front side of the device, i.e. the side opposite the winch assembly, the other end of the folding support will be attached to the rearward side of the device. In the illustrative embodiment, there are two sets of folding supports, one on either the right or left side. Each set consists of two members that cross one another and are connected near their centers to generally form and "X" shape. Lifting mechanisms that use this type of arrangement are often referred to as "scissor" lifts.

The linear hydraulic motor 33 is equipped with mounting brackets at both its hydraulic cylinder and piston rod to allow for rotation as the motor extends. Brackets that use a shackle and clevis pin arrangement, for example, would suffice. The base of the hydraulic cylinder, i.e., the end opposite the piston rod, is attached to the bottom frame of the device. The piston rod is attached to the lower portion of the two members from the folding supports 31, which are attached to the front of the device by a mounting bracket attached to a cross bar between the two supports, or at any other suitable point of attachment that will apply the linear force generated by the extending piston rod to the two bars. As the piston rod extends, the linear force is transformed to vertical lift as these two members of the X-shaped folding supports 31 are forced upward causing the X-shaped folding supports 31 to unfold.

The force that extends the piston rod is generated by the increase in hydraulic pressure inside the hydraulic cylinder. In the illustrative embodiment this hydraulic pressure is generated manually through the use of a foot pump 34. The user repeatedly pushes the foot pump 34 in a downward direction and allows it to return to its upright position to increase the pressure inside the hydraulic cylinder. To decrease the pressure, thereby lowering the device, the user releases pressure back into the hydraulic pump using the release valve 35.

Though the linear hydraulic motor is used in the illustrative embodiment, those skilled in the art appreciate that other types of mechanical apparatuses can be used to generate the necessary linear force required to lift the device. By way of example, and not limitation, a leadscrew or jack screw arrangement could also be used which could translate the linear movement of a nut across an Acme or other suitable thread into linear force. Such jack screws are often used as, for example, automobile jacks and have the added safety feature of being self locking and not subject to failure due to loss of hydraulic pressure.

The bottom frame 15 has attached to it two sets of wheels comprised of the rear wheel assembly 50 and the front wheel assembly 60. For purposes of illustration, the wheel assembly mounted on the same side as the winch assembly is referred to as the front wheel assembly. These wheels enable the user to easily and quickly position the device in front of an open pipeline to extract a pig. Though the embodiment illustrated is equipped with wheels, rollers, tracks, air casters or similar arrangements suitable for the terrain upon which the device is to be operated may be used.

The rear wheel assembly 50 is attached to the bottom frame by the rear wheel brackets 51. In FIG. 2 the rear wheel brackets are bolted to the bottom frame 15, however, any suitable means of attachment may be used. The rear wheel bracket 51 is generally L-shaped and has a triangular truss 52 added for support. Attached to the wheel bracket 51 is the rear wheel fork 53, which has two descending arms that extend down to the wheel axle 57. The rear wheel assembly is further comprised of a rim 54, through which the wheel axle 57 extends, and a tire 55. In the embodiment shown in FIG. 2, the tire is made of rubber and filled with air. Nonetheless, solid tires could likewise be used. Regardless of whether they are air-filled or solid, the tires should be equipped with tread suitable for the conditions, e.g. muddy, sandy or loose soil, under which the device is operated.

The embodiment illustrated in the Figures is positioned in place using man power. Nonetheless, those skilled in the art appreciate that apparatuses could be attached or otherwise linked to one or more of the wheels to provide the motive force for positioning the device. For example, assuming they would not pose an unsafe source of ignition, simple electric motors, or alternatively explosion proof motors designed to be operated in the presence of flammable substances, could be used. Likewise, pneumatic or hydraulic driven motors could also be used.

Like the front wheel assembly 50, the rear wheel assembly 60 is attached to the bottom frame 15. The front wheel assembly 60 is attached to front wheel brackets 61 and 65. Like their rear wheel counterparts, front wheel brackets 61 and 65 are generally L-shaped, and, similar to rear wheel bracket 51, wheel bracket 61 is equipped with a triangular support member 62. Front wheel forks 64 are attached to and extend downward from front wheel bracket 61 and attach at their opposite ends to the front wheel axle. Unlike the rear wheel assembly, however, the front wheel fork 64 is capable of rotation about an axis perpendicular to the ground thereby facilitating steering of the device to position it in place. The front wheel assembly uses the same or similar axles, rims and tires as those used for the rear wheel assembly.

Figure 3:
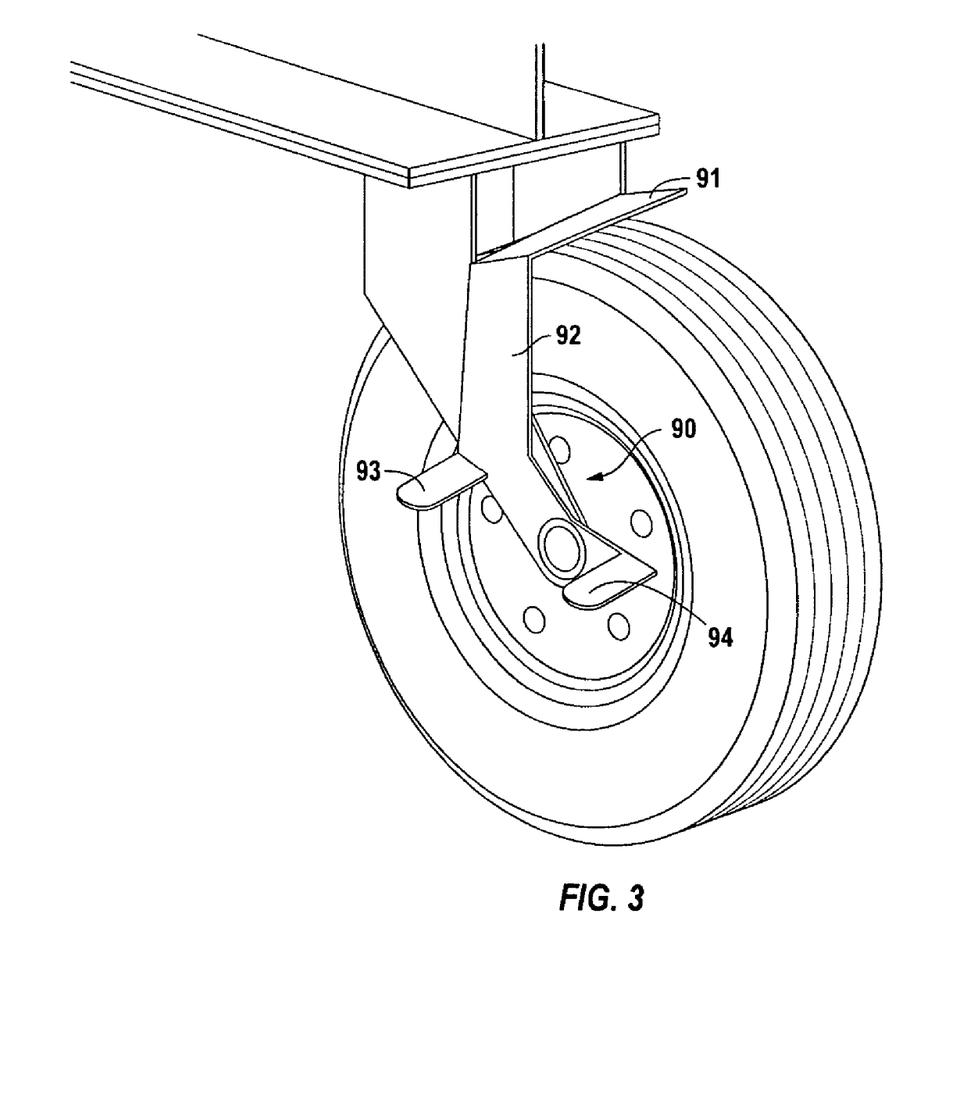
FIG. 3 depicts one of the locking wheels used on the illustrative embodiment to prevent unwanted movement of the device.

Shown in FIG. 3 is an example of a brake mechanism which is also part of front wheel assembly 60. The front break is a simple manual brake comprising a lever 94 with two foot pedals 93 on either end. Lever 94 is attached to a second lever 92 which is bent at an approximately 90 degree angle to form an extension 91 over the front tire. When pressure is applied to the lever 94 in the proper direction, it rotates about its attachment point with the front axle, thereby causing the extension 91 to engage the tire and exert a frictional force to prevent rotation of that tire. By simply applying downward pressure on the opposite end of lever 94, the extension 91 is disengaged from the tire thereby allowing free rotation of that tire.

Figure 4:
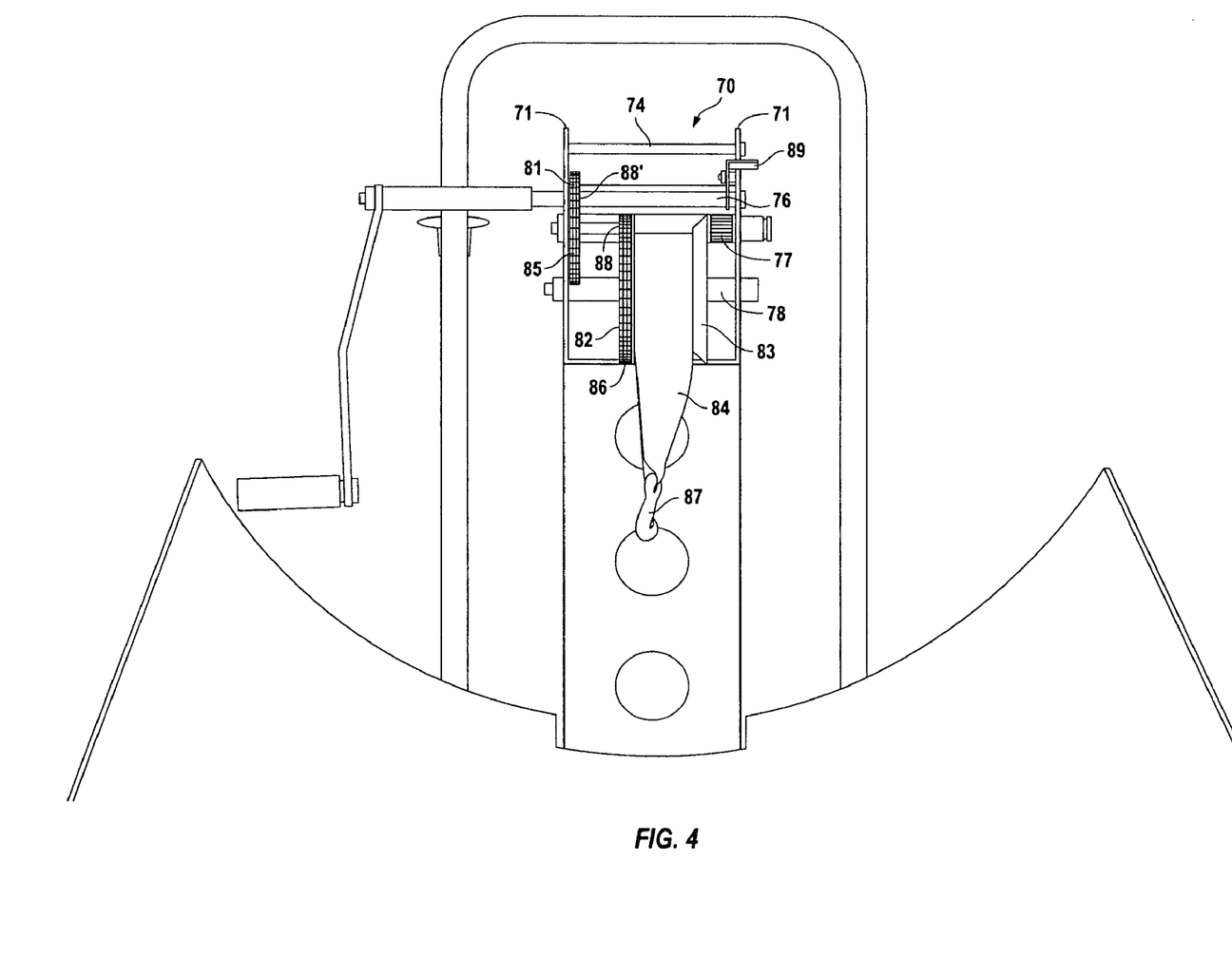
FIG. 4 depicts the winch-type mechanism used to extract the pig from the pipeline.

FIG. 4 is a front view of the winching assembly 70 used to extract the pig from inside the pipeline and onto the tray assembly 20. In the embodiment shown in FIGS. 1-4, the winching assembly is a simply manual type winch comprising a cable or strap 84 which is wound around a drum or spool 83 by rotating the handle 72. As explained above with reference to the wheels, though the force to wind the spool is provided manually in the illustrative embodiment, other electromechanical, hydraulic or pneumatic motors may be used. The winch assembly in FIG. 4 further comprises two plates 71 which make up the housing or body of the winch assembly 70. Disposed in between plates 71 are one or more bolts 74 and axles 76, 77, 78. The winch handle 71 is connected to winch handle axle 76, but can be removed if necessary to facilitate unwinding of winch strap or cable 84. Disposed on winch axle 76 is a gear 81 around which a chain 85 is placed. Chain 85 also wraps around second gear 88 which is connected to an intermediate axle 77. Intermediate axle 77 has connected to it a third gear 88'. This third gear 88' is in turn connected to a fourth gear 82 via a second chain 86. Gear 82 is connected to the winch spool or drum 83. This set of four gears allows for a gear reduction which provides a mechanical advantage through an increase in torque which facilitates the extraction of the pig from the pipeline. Winch assembly 70 also includes a hook 87 or other suitable means for attaching the strap 84 to the pig. Additionally, a winch release mechanism 73 and a sliding lock mechanism 89 for releasing the winch handle 72 are provided, both of which facilitate unwinding of the winch strap 84.

Figure 5:
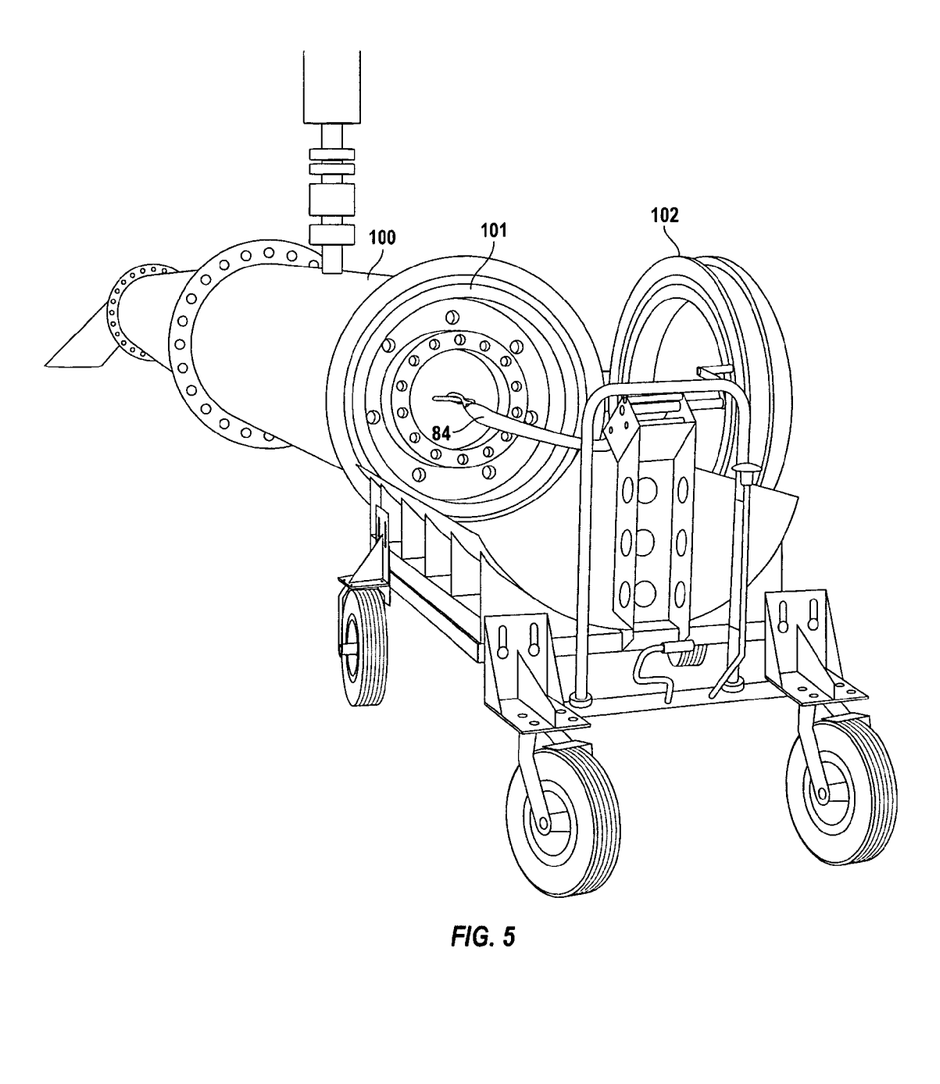
FIG. 5 depicts an illustrative embodiment in use to extract a pig from a pipeline.
Figure 6:
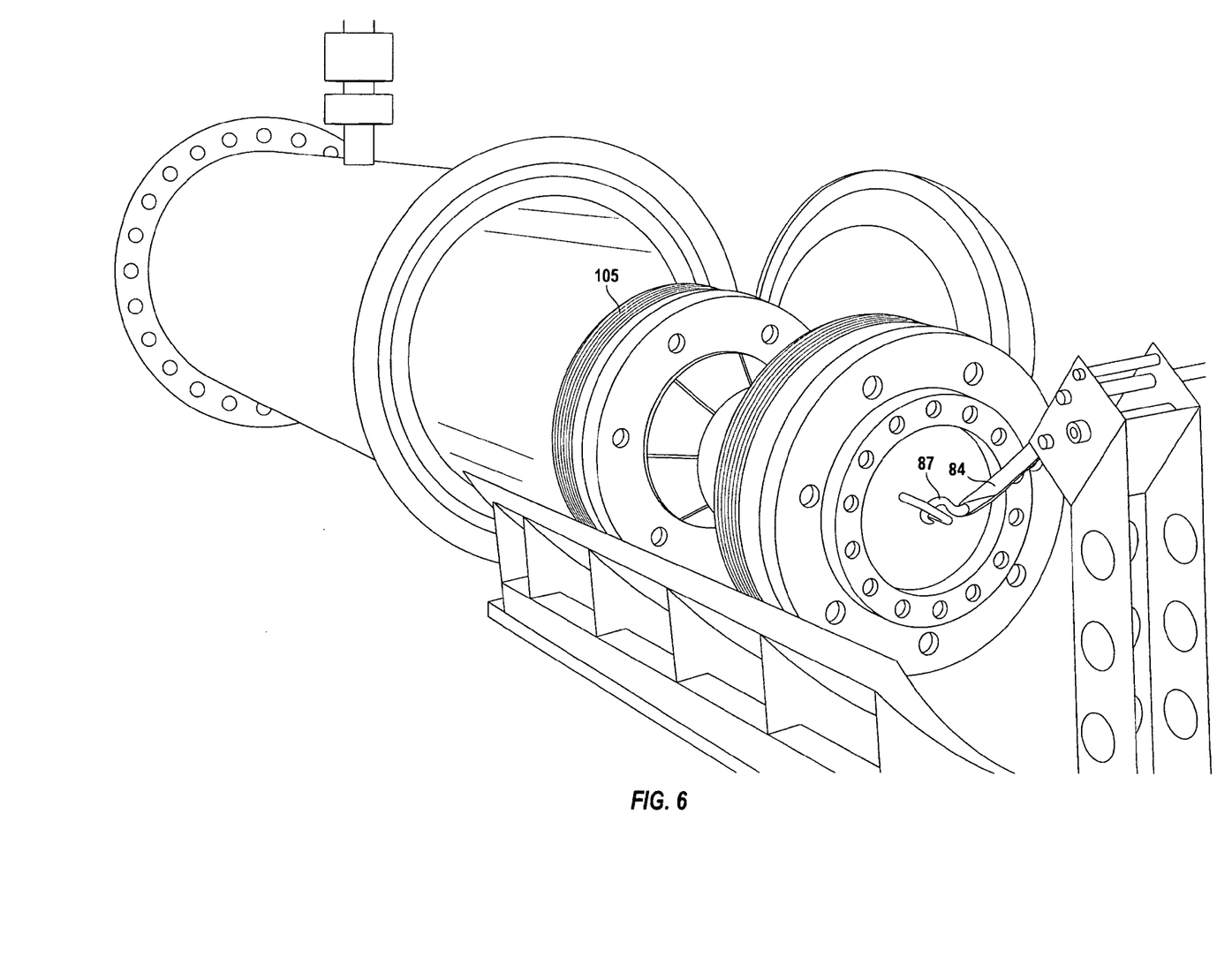
FIG. 6 depicts the illustrative embodiment in use wherein a pig has been extracted from the pipeline onto the device using the method described herein.

FIGS. 5 and 6 depict a method for using the pig extraction device to remove a pig. With the door 102 of the pig catcher 100 in the closed position, the device is positioned in front of the pig catcher and, using the lifting mechanism 30, the proper height for the device is set. In addition, the winch strap 84 is unwound to provide the length of strap that will be needed to attach the hook 87 to the pig 105. After these adjustments are made, the device should be moved away from the door 102 so that the door may be opened.

Next, the door 102 must be opened to expose the opening 101 of the pig catcher 100 and the pig 105. Using the hook 87, the winch strap 84 is attached to the pig 105, which is still disposed inside the pig catcher 100. Using the winch handle 71, the strap 84 is wound about the winch spool 83. As the strap 84 is wound around the spool 83, the pig is pulled out of the pig catcher 100 and onto the tray channel 21 of the device. Due to the downward force that the weight of the pig 105 exerts on the device, it may be necessary to adjust the height of the device as the pig 105 is partially extracted from the pig catcher 100. As shown in FIG. 6, once the strap 84 is sufficiently wound, the pig 105 will come to rest in the tray channel 20. Then the device and pig and be easily and quickly moved, allowing the door 102 to be closed, thereby resealing the pig catcher 100.

The above description sets forth an embodiment that the inventor discovered provides a preferred configuration and mode for practicing the claimed invention. Unless specified otherwise, however, neither the description of the device, nor the method for using it, is intended to limit the scope of the properly construed claims. Thus, neither the materials of the device nor their configuration as disclosed in the illustrative embodiment limit the claims unless specifically stated otherwise. Likewise the specific number and order of steps or procedures used to describe the method of operating the device do not limit the claims unless otherwise specified. Thus, to determine the scope of the invention, reference should be made to the claims that follow.

What is claimed is:
1. A portable device for extracting a pig from a pipeline comprising:
 (a) a tray for receiving said pig;
 (b) a top frame connected to said tray;
 (c) a bottom frame;
 (d) a lifting assembly disposed between said top frame and bottom frame for adjusting the height of said tray;
 (e) a cable which can be attached to said pig; and

(f) a device attached to said top frame for winding said cable unto a drum thereby pulling said pig out of said pipeline and unto said tray.

2. A device according to claim 1 wherein wheels are attached to the bottom frame.

3. A device according to claim 2 wherein the wheels are equipped with locking mechanisms.

4. A device according to claim 1 wherein the cable is wound onto said drum manually.

5. A device according to claim 1 wherein the cable is wound onto said drum mechanically.

6. A device according to claim 1 wherein the lifting mechanism is a linear hydraulic motor comprised of a hydraulic pump, a hydraulic cylinder attached to said bottom frame and a piston rod attached to a folding support member.

7. A device according to claim 6 wherein the hydraulic pressure for said linear hydraulic motor is generated manually.

8. A device according to claim 6 wherein the hydraulic pressure for said linear hydraulic motor is generated mechanically.

9. A device according to claim 1 wherein said tray is generally u-shaped.

10. A device according to claim 1 wherein said tray is composed of aluminum.

11. A device for extracting a pig from a pipeline comprising:
 (a) a tray for receiving said pig;
 (b) a top frame attached to the bottom of said tray;
 (c) a bottom frame with a set of front wheels and a set of rear wheels attached thereto;
 (d) a lifting mechanism disposed between said top frame and bottom frame for adjusting the height of said tray;
 (e) a cable which can be attached to said pig; and
 (f) a device attached to said top frame for winding said cable unto a drum thereby pulling said pig out of said pipeline and unto said tray.

12. A device according to claim 11 wherein said set of front wheels are steerably mounted to allow rotation about an axis generally perpendicular to the ground.

13. A device according to claim 11 wherein the force for the lifting assembly is generated by a linear hydraulic motor.

14. A device according to claim 13 wherein the linear hydraulic motor comprises a pneumatic hydraulic pump, a hydraulic cylinder and a piston rod.

15. A device according to claim 13 wherein the linear hydraulic motor comprises an electro-mechanical hydraulic pump, a hydraulic cylinder and a piston rod.

16. A method of extracting a pig from a pipeline comprising:
 (a) moving a wheeled device equipped with a tray for receiving said pig in position in front of a pipeline containing said pig;
 (b) adjusting the height of said tray to align it at the proper level to receive said pig from said pipeline;
 (c) attaching a cable to said pig; and
 (d) extracting said pig from said pipeline by winding said cable onto a drum.

17. The method of claim 16 wherein said cable is composed of steel.

18. The method of claim 16 wherein said cable is wound onto said drum manually.

19. The method of claim 16 wherein said drum is equipped with a brake that prevents it from unwinding.

20. The method of claim 16 wherein said wheels are locked in place to prevent unwanted movement of the device during operation.

* * * * *

UNITED STATES PATENT AND TRADEMARK OFFICE
CERTIFICATE OF CORRECTION

| | | |
|---|---|---|
| PATENT NO. | : 7,954,194 B2 | |
| APPLICATION NO. | : 12/002022 | |
| DATED | : June 7, 2011 | |
| INVENTOR(S) | : Hepburn | |

It is certified that error appears in the above-identified patent and that said Letters Patent is hereby corrected as shown below:

In column 1, line 36, delete "modem" and insert -- modern --, therefor.

In column 2, line 17, delete "modem" and insert -- modern --, therefor.

In column 3, line 44, delete "our" and insert -- out --, therefor.

Signed and Sealed this
Thirteenth Day of September, 2011

David J. Kappos
*Director of the United States Patent and Trademark Office*